United States Patent
Mandare et al.

(10) Patent No.: US 8,580,388 B2
(45) Date of Patent: *Nov. 12, 2013

(54) COMPOSITION SUITABLE FOR STRETCH HOOD, METHOD OF PRODUCING THE SAME, AND ARTICLES MADE THEREFROM

(71) Applicant: Dow Global Technologies LLC, Midland, MI (US)

(72) Inventors: Prashant Mandare, Pearland, TX (US); Gregory Bunker, Katy, TX (US); Rajen M. Patel, Lake Jackson, TX (US); Yi Jin, Missouri City, TX (US); Selim Bensason, Baech (CH); Mehmet Demirors, Pearland, TX (US); Theresa J. Hermel-Davidock, Newton, NJ (US); Sarah M. Hayne, Houston, TX (US); Jose E. Ruiz, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,246

(22) Filed: Feb. 5, 2013

(65) Prior Publication Data
US 2013/0149519 A1 Jun. 13, 2013

Related U.S. Application Data

(63) Continuation of application No. 13/424,978, filed on Mar. 20, 2012, now Pat. No. 8,389,086, which is a continuation-in-part of application No. 12/781,247, filed on May 17, 2010, now Pat. No. 8,173,232.

(60) Provisional application No. 61/222,371, filed on Jul. 1, 2009.

(51) Int. Cl.
*B32B 27/00* (2006.01)

(52) U.S. Cl.
USPC .......... 428/500; 428/35.7; 428/332; 428/337; 428/339; 428/220; 521/40; 521/40.5; 521/47; 526/67; 526/68; 526/70; 526/72; 526/77

(58) Field of Classification Search
USPC ............... 428/35.7, 500, 332, 337, 339, 220; 521/40, 40.5, 47; 526/67, 68, 70, 72, 526/77
See application file for complete search history.

(56) References Cited

U.S. PATENT DOCUMENTS 5,844,045 A   12/1998   Kolthammer et al.
5,869,575 A   2/1999   Kolthammer et al.
(Continued)

OTHER PUBLICATIONS

Balke, et al., Chromatography Polymers, Chapter 13, 1993, pp. 198-219.
Mourey, et al., Chromatography Polymers., Chapter 12, 1993, pp. 181-198.
(Continued)

*Primary Examiner* — Michael C Miggins

(57) ABSTRACT

The instant invention provides a composition suitable for stretch hood, method of producing the same, and articles made therefrom. The article according to the present invention comprises a multi-layer film according to the present invention has a thickness of at least 3 mils comprising at least one inner layer and two exterior layers, wherein the inner layer comprises at least 50 weight percent polyethylene copolymer having a melt index less than 2 grams/10 minutes, a density less than or equal to 0.910 g/cm³, a total heat of fusion less than 120 Joules/gram and a heat of fusion above 115° C. of less than 5 Joules/gram, the total heat of fusion of the inner layer less than the heat of fusion of either of the two exterior layers, and wherein the multi-layer film has an elastic recovery of at least 40% when stretched to 100% elongation.

21 Claims, 10 Drawing Sheets

(56) References Cited

U.S. PATENT DOCUMENTS

| | | |
|---|---|---|
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 7,411,026 B2 | 8/2008 | Ohlsson et al. |
| 2005/0037219 A1 | 2/2005 | Ohlsson et al. |
| 2006/0040075 A1 | 2/2006 | Roulin et al. |
| 2006/0074192 A1 | 4/2006 | Roulin et al. |
| 2006/0094824 A1 | 5/2006 | Roulin et al. |
| 2008/0106005 A1 | 5/2008 | Fiscus et al. |
| 2008/0226920 A1 | 9/2008 | Parkinson et al. |
| 2009/0317614 A1 | 12/2009 | Nilsen et al. |

OTHER PUBLICATIONS

Monrabal, et al., Macromol. Symp., 2007, pp. 71-79, vol. 257.
PCT/US2011/036788, International Preliminary Report on Patentability.
PCT/US2011/036788, International Search Report.
PCT/US2011/036788, Written Opinion of the International Searching Authority.
Yau, Examples of Using 30-GPC-TREF for Polyolefin Characterization, Macromol. Symp., 2007, pp. 29-45, vol. 257.
Zimm, Journal of Chemical Phys., 1948, vol. 16, pp. 1099-1116.
EP Office Action dated Jan. 4, 2013; from EP counterpart Application No. 11 721 943.6.
EP Instructions to Office Action dated Jun. 13, 2013; from EP counterpart Application No. 11 721 943.6.
EP Response to Office Action dated Jun. 18, 2013; from EP counterpart Application No. 11 721 943.6.

$$CDC = \frac{\text{Comonomer Distrubution Index}}{\text{Comonomer Distribution Shape Factor}} = \frac{\text{Comonomer Distribution Index}}{\text{Half Width/Stdev}} * 100 \cdots\cdots \text{Equation 1}$$

Figure 1

% Crystallinity = $((H_f)/(292 \text{ J/g})) \times 100$  (Eq. 6).

Figure 2

$g_i' = (IV_{Sample,i} / IV_{linear\ reference,j})$  (Eq. 7),

Figure 3

$$\left[\frac{IV_{Sample,i}}{IV_{linear\_reference,j}}\right]^{1.33}_{M_{i-j}} = \left[\left(1+\frac{B_{n,i}}{7}\right)^{1/2} + \frac{4}{9}\frac{B_{n,i}}{\pi}\right]^{-1/2} \text{ (Eq. 8).}$$

Figure 4

$$LCBf = \frac{\sum\limits_{M=3500}^{i}\left(\frac{B_{n,i}}{M_i/14000}c_i\right)}{\sum c_i} \text{ (Eq. 9).}$$

Figure 5

$$M_{PE} = \left(\frac{K_{PS}}{K_{PE}}\right)^{1/\alpha_{PE}+1} \cdot M_{PS}^{\alpha_{PS}+1/\alpha_{PE}+1} \quad \text{(Eq. 10)},$$

Figure 6

$$[\eta]_{PE} = K_{PS} \cdot M_{PS}^{\alpha+1} / M_{PE} \quad \text{(Eq. 11).}$$

Figure 7

$$M_W = \sum_i w_i M_i = \sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS\ Area}{Conc.\ Area} \quad \text{(Eq. 12)}.$$

Figure 8

$$IV = [\eta] = \sum_i w_i IV_i = \sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP\ Area}{Conc.\ Area} \quad \text{(Eq. 13)},$$

Figure 9

$$Mw_{CC} = \sum_i \left(\frac{C_i}{\sum_i C_i}\right) M_i = \sum_i w_i M_i \quad \text{(Eq. 14)},$$

Figure 10

$$[\eta]_{CC} = \sum_i \left(\frac{C_i}{\sum_i C_i}\right) IV_i = \sum_i w_i IV_i \quad \text{(Eq. 15).}$$

Figure 11

$$gpcBR = \left[\left(\frac{[\eta]_{CC}}{[\eta]}\right) \cdot \left(\frac{M_W}{M_{W,CC}}\right)^{\alpha_{PE}} - 1\right] \text{ (Eq. 16),}$$

Figure 12

$$\text{Resolution} = \frac{\text{Peak temperature of NIST 1475a - Peak Temperature of Hexacontane}}{\text{Half - height Width of NIST 1475a + Half - height Width of Hexacontane}}$$

Figure 13

$$\int_{35}^{119.0} w_T(T)dT = 1 \cdots\cdots \text{Equation 2}$$

Figure 14

$$\int_{35}^{T_{median}} w_T(T)dT = 0.5 \cdots\cdots\cdots \text{Equation 3}$$

Figure 15

$$\ln(1 - comonomercontent) = -\frac{207.26}{273.12 + T} + 0.5533 \cdots\cdots \text{Equation 4}$$

$$Stdev = \sqrt{\sum_{35.0}^{119.0} (T - T_p)^2 * w_T(T)} \cdots\cdots \text{Equation 5}$$

Figure 17

$$M_{polyethylene}=A(M_{polystyrene})^B \quad \text{(Eq. 17)}$$

Figure 18

$$NCH_2=I_{total}/2 \quad \text{(Eq. 19)}.$$

Figure 19

| Group | Structure | Notation |
|---|---|---|
| Vinylene | | Vinylene1 |
| | | Vinylene2 |
| | | Vinylene3 |
| Trisubstituted unsaturation | | Trisubstituted |
| Vinyl | | Vinyl1 |
| | | Vinyl2 |
| Vinylidene | | Vinylidene1 |
| | | Vinylidene2 |
| | | Vinylidene3 |

Vinyl3

Figure 20

```
;lc1prf2_zz prosol relations=<lcnmr> include <Avance.incl>

"d12=20u"

"d11=4u"

1 ze d12 pl21:f2

2 30m d13 d12 pl9:f1 d1 cw:f1 ph29 cw:f2 ph29 d11 do:f1 do:f2 d12 pl1:f1 p1 ph1 go=2 ph31

30m mc #0 to 2 F0(zd)

exit
```

COMPOSITION SUITABLE FOR STRETCH HOOD, METHOD OF PRODUCING THE SAME, AND ARTICLES MADE THEREFROM

CROSS-REFERENCE TO RELATED APPLICATIONS

The present application is a continuation application of the U.S. application Ser. No. 13/424,978, filed on Mar. 20, 2012, entitled, "COMPOSITION FOR STRETCH HOOD, METHOD OF PRODUCING THE SAME, AND ARTICLES MADE THEREFROM," which is a continuation-in-part application of the U.S. application Ser. No. 12/781,247, filed on May 17, 2010, entitled "STRETCH HOOD FILMS," the teachings of which are incorporated by reference herein, as if reproduced in full hereinbelow, which claims priority from the U.S. Provisional Application No. 61/222,371, filed on Jul. 1, 2009, entitled "STRETCH HOOD FILMS," the teachings of which are incorporated by reference herein, as if reproduced in full hereinbelow.

FIELD OF INVENTION

The instant invention relates to a composition suitable for stretch hood, method of producing the same, and articles made therefrom.

BACKGROUND OF THE INVENTION

There have been many varieties of polyethylene polymers polymerized over the years, including those made using high pressure free radical chemistry (LDPE), more traditional linear low density polyethylene (LLDPE) typically made using Ziegler-Natta catalysis and metallocene or constrained geometry catalyzed polyethylene—some linear polyethylenes, but also some substantially linear polyethylene containing a slight amount of long chain branching. While these polymers have varying positives and negatives—depending on application or end-use—more control over the polymer structure is still desired.

We have now found that post-metallocene catalysts can efficiently polymerize ethylene into polymers and polymer compositions having controlled comonomer distribution profiles, while also controlling unsaturation levels in the polymer and that multi-layer films comprising such new polymers, especially when the new polymer comprises an inner layer, are useful as stretch hood films. Stretch hood films are useful in unitizing pallets of goods for shipment and transport.

SUMMARY OF THE INVENTION

The instant invention provides a composition suitable for stretch hood, method of producing the same, and articles made therefrom. In one embodiment, the present invention provides an article comprising a multi-layer film having a thickness of at least 3 mils comprising at least one inner layer and two exterior layers, wherein the inner layer comprises at least 50 weight percent polyethylene copolymer having a melt index less than 2 grams/10 minutes, a density less than or equal to 0.910 g/cm$^3$, a total heat of fusion less than 120 Joules/gram and a heat of fusion above 115° C. of less than 5 Joules/gram, the total heat of fusion of the inner layer less than the heat of fusion of either of the two exterior layers, and wherein the multi-layer film has an elastic recovery of at least 40% when stretched to 100% elongation.

In an alternative embodiment, the present invention provides an article comprising a multi-layer film, as described above, wherein the exterior layers are less than 50 weight percent of the total film.

In another embodiment, the present invention provides an article comprising a multilayer film, as described above, wherein the film has 3 layers and is made via blown film process.

In another alternative embodiment, the present invention provides an article comprising multilayer film, as described above, that is a stretch hood film structure.

In another alternative embodiment, the present invention provides an article comprising a multilayer film, as described above, wherein the polyethylene copolymer in the inner layer has a molecular weight distribution ($M_w/M_n$) of at least 2.5.

In another alternative embodiment, the present invention provides an article comprising a multilayer film, wherein the polyethylene copolymer of the inner layer is characterized by a Comonomer Distribution Constant (CDC) greater than about 45 and as high as 400, and wherein the polyethylene copolymer has less than 120 total unsaturation unit/1,000,000 carbons (C). CDC is defined as Comonomer Distribution Index divided by Comonomer Distribution Shape Factor multiplying by 100 (Equation 1, FIG. 1) Comonomer distribution index stands for the total weight fraction of polymer chains with the comonomer content ranging from 0.5 of median comonomer content ($C_{median}$)) and 1.5 of $C_{median}$ from 35.0 to 119.0° C. Comonomer Distribution Shape Factor is defined as a ratio of the width at half peak height (HalfWidth) of comonomer distribution profile divided by the standard deviation (Stdev) of comonomer distribution profile from the peak temperature ($T_p$).

In another alternative embodiment, the present invention provides an article comprising a multilayer film, as described above, wherein the polyethylene copolymer of the inner layer is characterized by up to about 3 long chain branches/1000 carbons.

In another alternative embodiment, the present invention provides an article comprising a multilayer film, as described above, wherein the polyethylene copolymer of the inner layer is further characterized as comprising less than 20 vinylidene unsaturation unit/1,000,000 C.

In another alternative embodiment, the present invention provides an article comprising a multilayer film, as described above, wherein the polyethylene copolymer of the inner layer comprises a single DSC melting peak.

In another alternative embodiment, the present invention provides an article comprising a multilayer film, as described above, wherein the multilayer film has a normalized dart impact, measured according to Dart B test (g/mil) (ASTM D-1709), in the range of from 350 g/mil to 700 g/mil; for example, from 350 g/mil to 600 g/mil.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1-19 illustrate various corresponding Equations;

FIG. 20 illustrates chemical structure representations of unsaturations;

FIG. 21 illustrates the modified pulse sequences for unsaturation with Bruker AVANCE 400 MHz spectrometer;

DETAILED DESCRIPTION OF THE INVENTION

Figure 22:
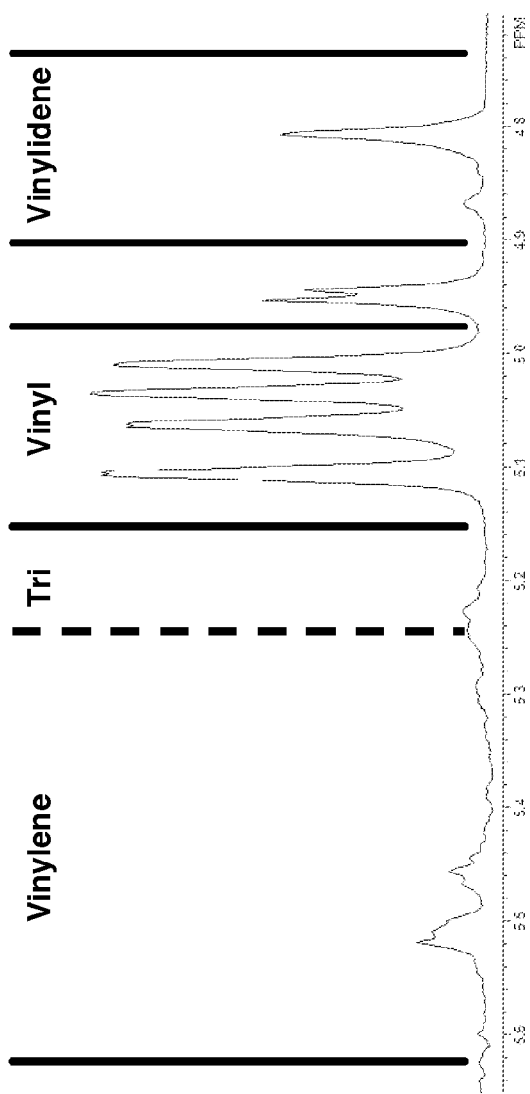
FIG. 22 displays integration limits for unsaturation of a related inventive composition; the dash line means the position can be slightly different depending on the sample/catalyst.

The instant invention provides a composition suitable for stretch hood, method of producing the same, and articles made therefrom. In one embodiment, the present invention provides an article comprising a multi-layer film having a thickness of at least 3 mils, for example, from 75 μm to 300 μm, or in the alternative, from 75 μm 150 μm, comprising at least one inner layer and two exterior layers, wherein the inner layer comprises at least 50 weight percent, for example, from 50 to 100 weight percent, polyethylene copolymer having a melt index less than or equal to 2 grams/10 minutes, for example from 0.2 to 2 grams/10 minutes, or in the alternative, from 0.2 to 1.5 grams/10 minutes, a density less than or equal to 0.910 g/cm³, for example from 0.8602 less than or equal to 0.910 g/cm³, an total heat of fusion less than 120 Joules/gram and a heat of fusion above 115° C. of less than 5 Joules/gram, and the total heat of fusion of the inner layer less than the heat of fusion of either of the two exterior layers, and wherein the multi-layer film has an elastic recovery of at least 40 percent, for example at least 42 percent, when stretched to 100 percent elongation.

In an alternative embodiment, the present invention provides an article comprising a multi-layer film, as described above, wherein the exterior layers are less than 50 weight percent of the total film.

In another embodiment, the present invention provides an article comprising a multilayer film, as described above, wherein the film has 3 layers and is made via blown film process.

In another alternative embodiment, the present invention provides an article multilayer film, as described above, that is a stretch hood film structure.

In another alternative embodiment, the present invention provides an article comprising a multilayer film, as described above, wherein the polyethylene copolymer in the inner layer has a molecular weight distribution ($M_w/M_n$) of at least 2.5, for example, from 2.5 to 3.5.

In another alternative embodiment, the present invention provides an article comprising a multilayer film, wherein the polyethylene copolymer of the inner layer is characterized by a Comonomer Distribution Constant (CDC) greater than about 45 and as high as 400, and wherein the polyethylene copolymer has less than 120 total unsaturation unit/1,000,000 carbons (C). CDC is defined as Comonomer Distribution Index divided by Comonomer Distribution Shape Factor multiplying by 100 (Equation 1, FIG. 1) Comonomer distribution index stands for the total weight fraction of polymer chains with the comonomer content ranging from 0.5 of median comonomer content ($C_{median}$)) and 1.5 of $C_{median}$ from 35.0 to 119.0° C. Comonomer Distribution Shape Factor is defined as a ratio of the width at half peak height (HalfWidth) of comonomer distribution profile divided by the standard deviation (Stdev) of comonomer distribution profile from the peak temperature ($T_p$).

In another alternative embodiment, the present invention provides an article comprising a multilayer film, as described above, wherein the polyethylene copolymer of the inner layer is characterized by up to about 3 long chain branches/1000 carbons.

In another alternative embodiment, the present invention provides an article comprising a multilayer film, as described above, wherein the polyethylene copolymer of the inner layer is further characterized as comprising less than 20 vinylidene unsaturation unit/1,000,000 C.

In another alternative embodiment, the present invention provides an article comprising a multilayer film, as described above, wherein the polyethylene copolymer of the inner layer comprises a single DSC melting peak.

In another alternative embodiment, the present invention provides an article comprising a multilayer film, as described above, wherein the multilayer film has a normalized dart impact, measured according to Dart B test (g/mil) (ASTM D-1709), in the range of from 350 g/mil to 700 g/mil; for example, from 350 g/mil to 600 g/mil.

In some processes, processing aids, such as plasticizers, can also be included in the inventive ethylene-based polymer. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

In some processes, inventive ethylene-based polymers are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The inventive ethylene-based polymer composition may, for example, comprise less than 10 percent by the combined weight of one or more additives, based on the weight of the inventive ethylene-based polymer composition and such additives. A particular benefit of the claimed polymers is the absence of catalyst kill agents, other than water, thus eliminating the need for calcium stearate.

The inventive ethylene-based polymer compositions produced may further be compounded. In some embodiments, one or more antioxidants may further be compounded into the inventive ethylene-based polymer compositions and the compounded inventive ethylene-based polymer compositions is then pelletized. The compounded ethylene-based polymer composition may contain any amount of one or more antioxidants. For example, the compounded inventive ethylene-based polymer compositions may comprise from about 200 to about 600 parts of one or more phenolic antioxidants per one million parts of the inventive ethylene-based polymer compositions. In addition, the compounded ethylene-based polymer composition may comprise from about 800 to about 1200 parts of a phosphite-based antioxidant per one million parts of inventive ethylene-based polymer compositions. The compounded inventive ethylene-based polymer compositions may further comprise from about 300 to about 1250 parts of calcium stearate per one million parts of inventive ethylene-based polymer compositions Uses The inventive ethylene-based polymer compositions may be employed in a variety of conventional thermoplastic fabrication processes to produce useful articles, including objects comprising at least one film layer, such as a monolayer film, or at least one layer in a multilayer film prepared by cast, blown, calendared, or extrusion coating processes; molded articles, such as blow molded, injection molded, or rotomolded articles; extrusions; fibers; and woven or nonwoven fabrics. Multi-layer films, preferably 3 layer films, are useful in the invention, especially where the multi-layer film can be used in a stretch hood application. Thermoplastic compositions comprising the inventive ethylene-based polymer compositions include blends with other natural or synthetic materials, polymers, additives, reinforcing agents, ignition resistant additives, antioxidants, stabilizers, colorants, extenders, crosslinkers, blowing agents, and plasticizers.

Additives and adjuvants may be added to the inventive ethylene-based polymer compositions post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the inventive ethylene-based polymer compositions with other polyolefins may be performed. Suitable polymers for blending with the inventive ethylene-based polymer compositions include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. Nos. 6,545,088 (Kolthammer, et al.); 6,538,070 (Cardwell, et al.); 6,566,446 (Parikh, et al.); 5,844,045 (Kolthammer, et al.); 5,869,575 (Kolthammer, et al.); and 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the inventive ethylene-based polymer compositions.

The inventive ethylene-based polymer compositions maybe employed as a sealant resins. Surprisingly, certain short chain branching distribution (SCBD), as shown by CDC, in combination with certain MWD, and a certain level of long chain branching (LCB) has shown to improve hot tack and heat seal performance, including increased hot-tack & heat-seal strength, lower heat seal and hot tack initiation temperatures, and a broadening of the hot tack window. The ethylenic polymer maybe employed as a pipe and tubing resin through an optimization of the SCBD and MWD, with low unsaturation levels for improved ESCR (environmental stress crack resistance) and higher PENT (Pennsylvania Edge-Notch Tensile Test). The ethylenic polymer maybe employed in applications where UV stability, weatherability are desired through an optimization of the SCBD and MWD, in combination with low unsaturation levels, and low levels of low molecular weight, high commoner incorporated oligomers. The ethylenic polymer maybe employed in applications where low levels of plate-out, blooming, die build-up, smoke formation, extractables, taste, and odor are desired through an optimization of the SCBD and MWD with low levels of low molecular weight, high comonomer incorporated oligomers. The ethylenic polymer maybe employed in stretch film applications. Surprisingly, certain SCBD, in combination with certain MWD, and a certain level of long chain branching (LCB) shows improved stretchability and dynamic puncture resistance.

DEFINITIONS

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer can be substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

EXAMPLES

The following examples illustrate the present invention but are not intended to limit the scope of the invention. The examples of the instant invention demonstrate improved elastic recovery while improving machine direction Elmendorf Tear and Dart B as well.
Resin Production All raw materials (ethylene, 1-octene) and the process solvent (a narrow boiling range high-purity isoparaffinic solvent trademarked Isopar E and commercially available from Exxon Mobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 750 psig. The solvent and comonomer (1-octene) feed is pressurized via mechanical positive displacement pump to above reaction pressure at 750 psig. The individual catalyst components are manually batch diluted to specified component concentrations with purified solvent (Isopar E) and pressured to above reaction pressure at 750 psig. All reaction feed flows are measured with mass flow meters and independently controlled with computer automated valve control systems.

The continuous solution polymerization reactors consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor it is contacted with water to stop the reaction. In addition, various additives such as anti-oxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. After validation of initial polymer properties the solid polymer pellets are manually dumped into a box for storage. Each box typically holds ~1200 pounds of polymer pellets.

The non-polymer portions removed in the devolatilization step pass through various pieces of equipment which separate most of the ethylene which is removed from the system to a vent destruction unit (it is recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers.
Inventive Ethylene-Based Polymer Compositions (Inventive Example 1)

Inventive ethylene-based polymer compositions, i.e. Inventive Example 1, is prepared according to the above procedure. Inventive Example 1 was tested for various properties according to the test methods described below, and these properties are reported in Tables 2 and Tables 4-7. The Table 1 and 1a-1d summarize the conditions for polymerization for the Inventive Example 1.
Resin A Specifications (Composition for Skin Layers of the Inventive Films 1 and 2)

Resin A has a target melt index of 0.8 dg/min and a target density of 0.912 g/cc. It is produced in a dual reactor solution process where a constrained geometry catalyst is used in the first reactor and a Ziegler-Natta catalyst is used in the second reactor. Table 3 reports the melt index, density and % polymer split for the two reactors used to make Resin A.
Film Fabrication Alpine seven layer blown film line was used to produce 3 layer co-extruded films comprising 2 skin layers (layers 1 and 7, respectively) each comprising a single layer having a thickness of approximately 20 percent by volume, based on the total volume of the 3 layer co-extruded film, and one core layer derived from five single layers (layers 2-6) having a total thickness of approximately 60 percent by volume, based on the total volume of the 3 layer co-extruded film. The blown film line consists of seven groove fed extruders with single flight screws (all 50 mm). The length/diameter (L/D) ratio for all screws is 30:1. The blown film line has a 250 mm die with dual lip air ring cooling system, with a screen pack configuration of 20:40:60:80:20 mesh and is equipped with internal bubble cooling system. Extruders 1 and 7 feed into skin layers on either side of the co-extruded film and extruders 2, 3, 4, 5 and 6 feed into the core layer of the 3-layer film. All films are produced at 4 mil thickness.

Extrusion Data—Inventive Film 1

Extruders 1 and 7 contained 93.5 wt % of Resin A, 5 wt % of antiblock master batch as described below, 1.5 wt % of slip master batch and 0.5 wt % of process aid master batch. Extruders 2 through 6 contained 98.5 wt % of inventive polymer (Inventive Examples 1), 1 wt % of slip master batch and 0.5 wt % of process aid masterbatch. The fabrication conditions are reported in Tables 8, 8a, and 8b.

Process aid masterbatch, Ingenia AC-0101, available from Ingenia Polymers, comprises 8% by weight of a process aid;

Anti-block masterbatch, AMPACET 10063, available from Amapcet Corp, comprises 20% by weight of an anti-block agent; and Slip masterbatch, AMPACET 10090, available from Amapcet Corp, comprises 5% by weight of a slip agent.

Extrusion Data—Inventive Film 2

Extruders 1 and 7 contained 93.5 wt % of resin A, 5 wt % of antiblock master batch, 1.5 wt % of slip master batch and 0.5 wt % of process aid master batch. Extruders 2 through 6 contained 98.5 wt % of inventive polymer (Inventive Example 1), 1 wt % of slip master batch and 0.5 wt % of process aid masterbatch. The fabrication conditions are reported in Tables 9, 9a, and 9b.

Process aid masterbatch, Ingenia AC-0101, available from Ingenia Polymers, comprises 8% by weight of a process aid;

Anti-block masterbatch, AMPACET 10063, available from Amapcet Corp, comprises 20% by weight of an anti-block agent; and Slip masterbatch, AMPACET 10090, available from Amapcet Corp, comprises 5% by weight of a slip agent.

Extrusion Data—Comparative Film 1

Extruders 1 and 7 contained 98.12 wt % of a 1.0 melt index, 0.918 g/cm³ density metallocene polyethylene, 1.38 wt % of antiblock master batch, and 0.5 wt % of process aid master batch. Extruders 2 through 6 contained 99.5 wt % of a 0.5 melt index, approximately 0.930 g/cc density, 7.5% by wt of units derived from VA in the ethylene vinyl acetate copolymer and 0.5 wt % of process aid masterbatch. The fabrication conditions are reported in Tables 10, 10a, and 10b.

Process aid masterbatch, Ingenia AC-0101, available from Ingenia Polymers, comprises 8% by weight of a process aid;

Anti-block masterbatch, AMPACET 10063, available from Amapcet Corp, comprises 20% by weight of an anti-block agent; and Slip masterbatch, AMPACET 10090, available from Amapcet Corp, comprises 5% by weight of a slip agent.

Extrusion Data—Comparative 2

Extruders 1 and 7 contained 98.12 wt % of a 1.0 melt index, 0.918 g/cc density metallocene polyethylene, 1.38 wt % of antiblock master batch, and 0.5 wt % of process aid master batch. Extruders 2 through 6 contained 99.5 wt % of a 0.5 melt index, approximately 0.930 g/cc density, 7.5% by wt of units derived from VA in the ethylene vinyl acetate copolymer and 0.5 wt % of process aid masterbatch. The fabrication conditions are reported in Tables 11, 11a, and 11b.

Process aid masterbatch, Ingenia AC-0101, available from Ingenia Polymers, comprises 8% by weight of a process aid;

Anti-block masterbatch, AMPACET 10063, available from Amapcet Corp, comprises 20% by weight of an anti-block agent; and Slip masterbatch, AMPACET 10090, available from Amapcet Corp, comprises 5% by weight of a slip agent.

The inventive films 1 and 2 and comparative films 1 and 2 are tested for their various properties according to the test methods described below and these properties are reported in Table 12.

Test Methods

Density

Samples that are measured for density are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Differential Scanning Calorimetry (DSC)

Baseline calibration of the TA Instrument's DSC Q1000 is performed by using the calibration wizard in the software. First, a baseline is obtained by heating the cell from −80° C. to 280° C. without any sample in the aluminum DSC pan. After that, sapphire standards are used according to the instructions in the wizard. Then about 1-2 mg of a fresh indium sample is analyzed by heating the sample to 180° C., cooling the sample to 120° C. at a cooling rate of 10° C./min followed by keeping the sample isothermally at 120° C. for 1 minute, followed by heating the sample from 120° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

Figure 25:
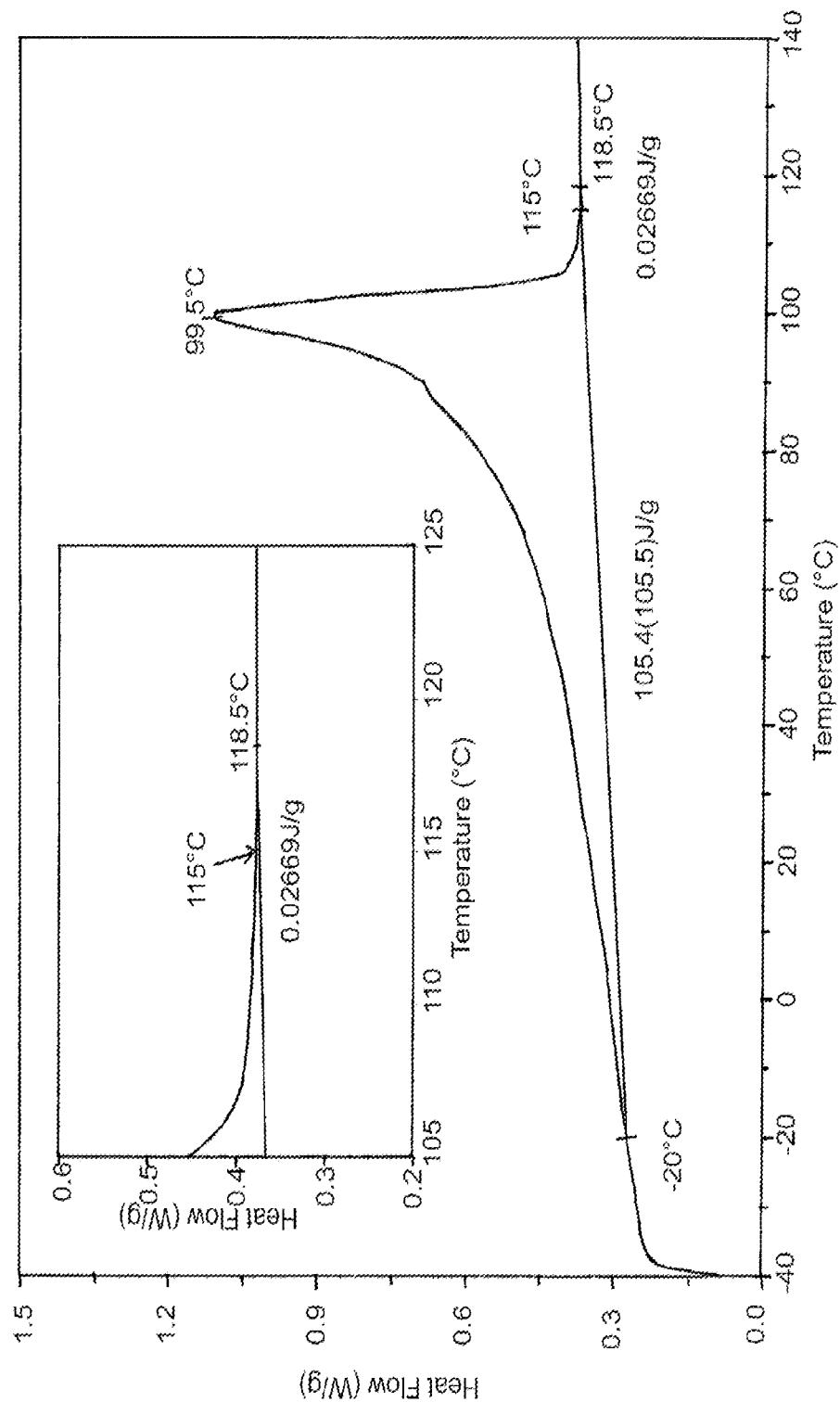
FIG. 25 is a graph illustrating the relationship between Heat flow (W/g) versus temperature (° C.) generated from the $2^{nd}$ heat DSC data.

Samples of polymer are pressed into a thin film at a temperature of 350° F. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature at least 30° C. above the polymer melt temperature, or 180° C. The sample is kept at this temperature for about 5 minutes. Then the sample is cooled at a rate of 10° C./min to a least 50° C. below the crystallization temperature, or −40° C., and kept isothermally at that temperature for 5 minutes. The sample is then heated at a rate of 10° C./min until melting is complete. The resulting enthalpy curves are analyzed. The cool curve heat of fusion (J/g) is calculated by integrating from the beginning of crystallization to −20° C. The second heating curve heat of fusion (J/g) is calculated by integrating from −20° C. to the end of melting. Additionally, a perpendicular to the X axis (temperature axis) placed at 115° C., to identify the area (J/g) before and after the drop as illustrated in FIG. 25.

Gel Permeation Chromatography (GPC)

The GPC system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102). The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_w$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 7 (FIG. 3):

where the calculation utilizes the $IV_{linear\ reference,j}$ at equivalent molecular weight, $M_j$, in the linear reference sample. In other words, the sample IV slice (i) and reference IV slice (j) have the same molecular weight ($M_i=M_j$). For simplicity, the $IV_{linear\ reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 8 (FIG. 4), assuming a viscosity shielding epsilon factor of 0.75:

Finally, the average LCBf quantity per 1000 carbons in the polymer across all of the slices (i) can be determined using Equation 9 (FIG. 5):

gpcBR Branching Index by 3D-GPC

In the 3D-GPC configuration the polyethylene and polystyrene standards can be used to measure the Mark-Houwink constants, K and α are independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 10 and 11 (FIGS. 6 & 7).

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$, by the light scattering (LS) detector using the peak area method. The method avoids the slice-by-slice ratio of light scattering detector signal over the concentration detector signal as required in the g' determination.

The area calculation in Equation 12 (FIG. 8) offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 13 (FIG. 9):

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 14 and 15 (FIGS. 10 and 11):

Equation 16 (FIG. 12) is used to determine the gpcBR branching index:

where [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (12), FIG. 8, is commonly referred to as the absolute Mw; while the Mw,cc from Equation (14), FIG. 10, using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 12-16, FIGS. 8-12.

The interpretation of gpcBR is straight forward. For linear polymers, gpcBR calculated from Equation 16, FIG. 12, will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

CEF Method

Comonomer distribution analysis is performed with Crystallization Elution Fractionation (CEF) (PolymerChar in Spain) (B. Monrabal et al, Macromol. Symp. 257, 71-79 (2007)). Ortho-dichlorobenzene (ODCB) with 600 ppm antioxidant butylated hydroxytoluene (BHT) is used as the solvent. Sample preparation is done with autosampler at 160° C. for 2 hours under shaking at 4 mg/ml (unless otherwise specified). The injection volume is 300 μl. The temperature profile of the CEF is: crystallization at 3° C./min from 110° C. to 30° C., thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

The CEF column is packed by the Dow Chemical Company with glass beads at 125 um±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. The temperature is calibrated by adjusting the elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in FIG. 13 where the column resolution is 6.0.

CDC Method

Comonomer distribution constant (CDC) is calculated from comonomer distribution profile by CEF. CDC is defined as Comonomer Distribution Index divided by Comonomer Distribution Shape Factor multiplying by 100 (Equation 1, FIG. 1)

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature (Tp).

CDC is calculated from comonomer distribution profile by CEF, and CDC is defined as Comonomer Distribution Index divided by Comonomer Distribution Shape Factor multiplying by 100 as shown in Equation 1, FIG. 1, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T$ (T)) from 35.0° C. to 119.0° C. with a temperature step increase of 0.200° C. from CEF according to Equation 2, FIG. 14.

(B) Calculate the median temperature ($T_{median}$) at cumulative weight fraction of 0.500, according to (Equation 3, FIG. 15)

(C) Calculate the corresponding median comonomer content in mole % ($C_{median}$) at the median temperature ($T_{median}$) by using comonomer content calibration curve according to (Equation 4, FIG. 16).

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Equation 4 as shown in FIG. 4, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according to Equation 5, FIG. 17.

Figure 23:
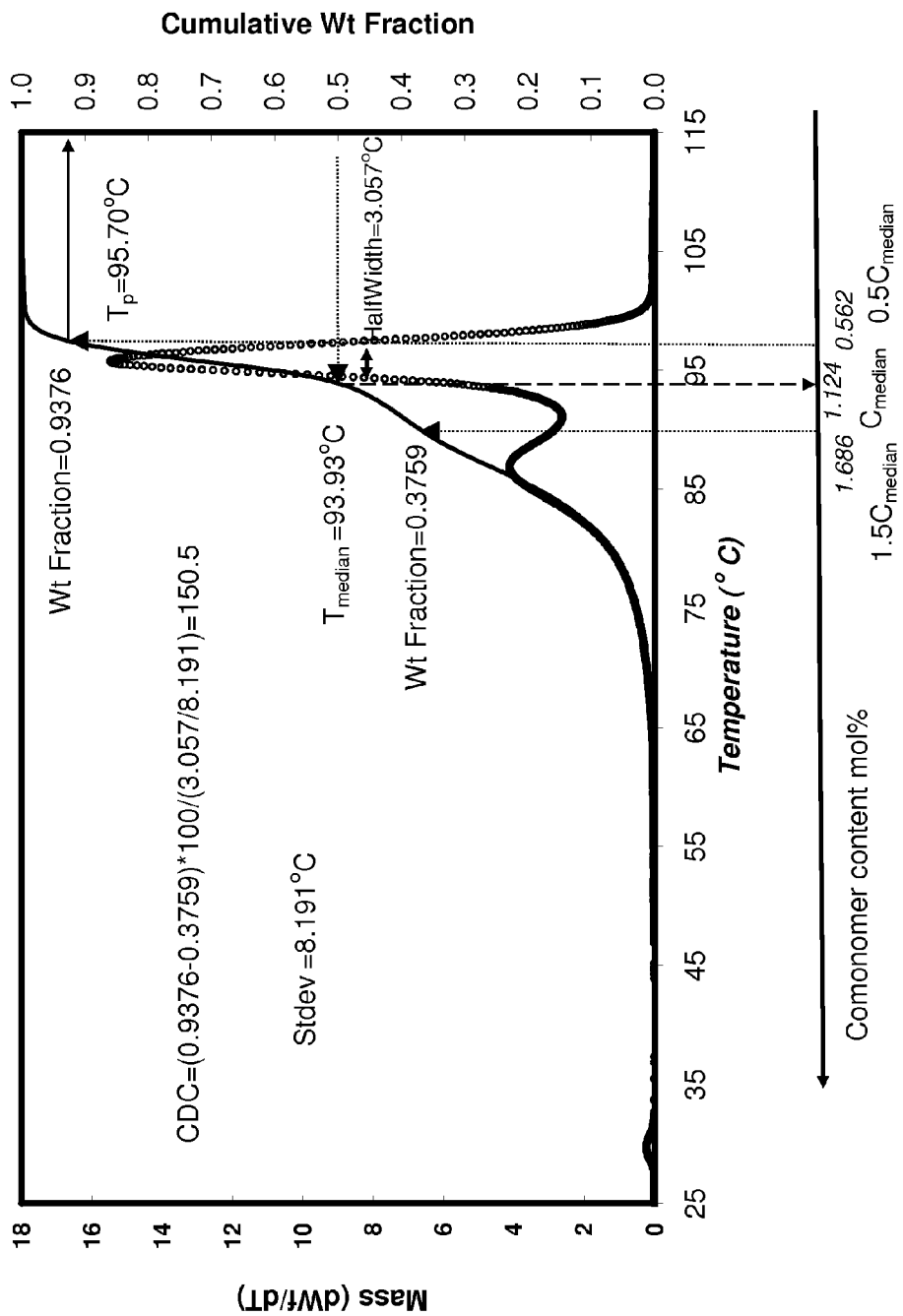
FIG. 23 is a schematic drawing for obtaining peak temperature, half width and median temperature from crystallization elution fractionation (CEF)
Figure 24:
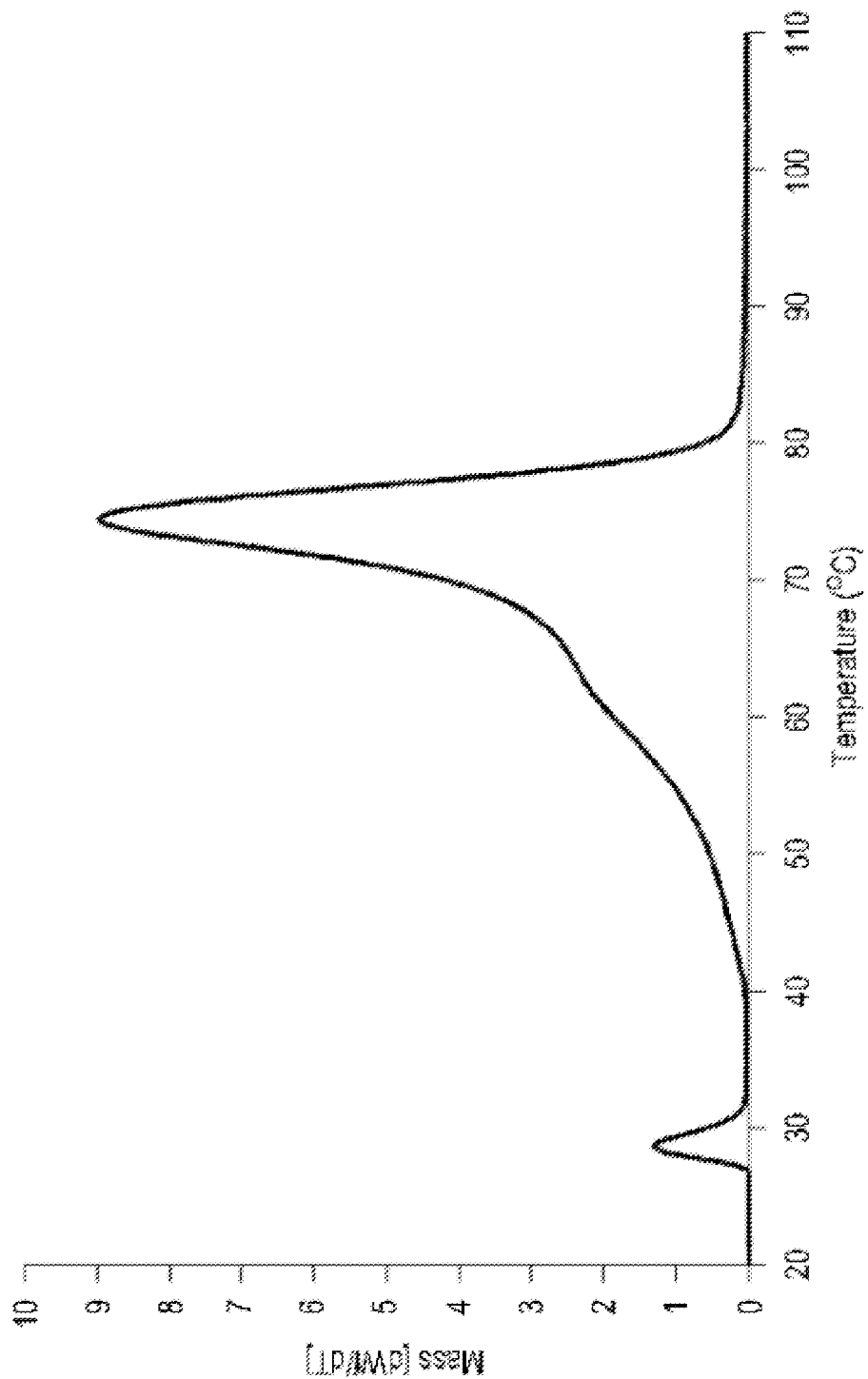
FIG. 24 is a graph illustrating the relationship between dW/dT vs. temperature (° C.) from CEF data.

An example of comonomer distribution profile is shown in FIG. 23.

Conventional GPC $M_{w\text{-}gpc}$ Determination

To obtain Mw-gpc values, the chromatographic system consist of either a Polymer Laboratories Model PL-210 or a Polymer Laboratories Model PL-220 equipped with a refractive index (RI) concentration detector. The column and carousel compartments are operated at 140° C. Three Polymer Laboratories 10-1 μm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights shown in FIG. 18 where M is the molecular weight, A has a value of 0.4316 and B is equal to 1.0.

A third order polynomial is determined to build the logarithmic molecular weight calibration as a function of elution volume. The weight-average molecular weight by the above conventional calibration is defined as $Mw_{cc}$ in the equation shown in Equation 14 as shown in FIG. 10. Where, the summation is across the GPC elution curve, with RI and $M_{cc}$ represents the RI detector signal and conventional calibration molecular weight at each GPC elution slice. Polyethylene equivalent molecular weight calculations are performed using Viscotek TriSEC software Version 3.0. The precision of the weight-average molecular weight ΔMw is excellent at <2.6%.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer. The pulse sequence is shown in Table below.

Two experiments are run to get the unsaturation: the control and the double presaturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as shown in FIG. 19.

For the double presaturation experiment, the data is processed with exponential window function with LB=1 Hz, baseline was corrected from 6.6 to 4.5 ppm. The signal from residual $^1H$ of TCE is set to 100, the corresponding integrals for unsaturations ($I_{vinylene}$, $I_{trisubstituted}$, $I_{vinyl}$ and $I_{vinylidene}$) were integrated based on the region shown in the following FIG. 2. The number of unsaturation unit for vinylene, trisubstituted, vinyl and vinylidene are calculated:

$$N_{vinylene}=I_{vinylene}/2$$

$$N_{trisubstituted}=I_{trisubstituted}$$

$$N_{vinyl}=I_{vinyl}/2$$

$$N_{vinylidene}=I_{vinylidene}/2$$

The unsaturation unit/1,000,000 carbons is calculated as following:

$$N_{vinylene}/1,000,000C=(N_{vinylene}/NCH_2)*1,000,000$$

$$N_{trisubstituted}/1,000,000C=(N_{trisubstituted}/NCH_2)*1,000,000$$

$$N_{vinyl}/1,000,000C=(N_{vinyl}/NCH_2)*1,000,000$$

$$N_{vinylidene}/1,000,000C=(N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1H$ signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown in FIG. 21.

Gel Content

Gel content is determined in accordance to ASTM D2765-01 Method A in xylene. The sample is cut to required size using a razor blade.

Film Testing Conditions

The following physical properties are measured on the films produced:

45° Gloss: ASTM D-2457.
MD and CD Elmendorf Tear Strength: ASTM D-1922.
MD and CD Tensile Strength: ASTM D-882.
Dart Impact Strength: ASTM D-1709.
Stretch hooder 100/75 test:

A film sample of dimensions 100 mm×25 mm and given thickness was used for the stretch hooder 100/75 test. The film sample was stretched to 100% elongation at a speed of 1000 mm/min using Instron 5581 mechanical testing system. When 100% elongation was reached, film sample was kept in this position for 15 seconds and then returned back to 75% elongation at a speed of 1000 mm/min. After waiting at this elongation for 5 minutes, load on the sample was measured and recorded as holding force. Afterwards, the Instron grips were returned to zero elongation and film sample was removed. After 24 hours of waiting at ambient conditions, final length of the film was measured and permanent deformation was calculated using the following equation.

$$\% \text{ permanent deformation} = \frac{\text{final length} - \text{initial length}}{\text{initial length}} \times 100$$

Elastic recover was calculated as

Elastic recovery=100−permanent deformation 5 specimens were used for each sample and average values for holding force, permanent set and elastic recovery are reported.

Stretch hooder 60/40 test

This test is very similar to stretch hooder 100/75 test except that initially the film sample is stretched to 60% elongation at a speed of 1000 mm/min, held there for 15 seconds and then returned to 40% elongation at same speed. Holding force was measured after waiting for 5 minutes at 40% elongation. The procedure for measuring permanent set and elastic recovery are exactly the same as the stretch hooder 100/75 test method.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

The present invention may be embodied in other forms without departing from the spirit and the essential attributes thereof, and, accordingly, reference should be made to the appended claims, rather than to the foregoing specification, as indicating the scope of the invention.

TABLE 1

| 1. REACTOR FEEDS | IE . . . 1 |
|---|---|
| Primary Reactor Feed Temperature (° C.) | 40.0 |
| Primary Reactor Total Solvent Flow (lb/hr) | 788 |
| Primary Reactor Fresh Ethylene Flow (lb/hr) | 151 |
| Primary Reactor Total Ethylene Flow (lb/hr) | 158 |
| Comonomer Type | 1-octene |
| Primary Reactor Fresh Comonomer Flow (lb/hr) | 0.0 |
| Primary Reactor Total Comonomer Flow (lb/hr) | 14.6 |
| Primary Reactor Feed Solvent/Ethylene Ratio | 5.22 |
| Primary Reactor Fresh Hydrogen Flow (sccm) | 4474 |
| Primary Reactor Hydrogen mole % | 0.43 |
| Secondary Reactor Feed Temperature (° C.) | 40.2 |
| Secondary Reactor Total Solvent Flow (lb/hr) | 439.6 |
| Secondary Reactor Fresh Ethylene Flow (lb/hr) | 142.0 |
| Secondary Reactor Total Ethylene Flow (lb/hr) | 145.8 |
| Secondary Reactor Fresh Comonomer Flow (lb/hr) | 14.3 |
| Secondary Reactor Total Comonomer Flow (lb/hr) | 22.2 |
| Secondary Reactor Feed Solvent/Ethylene Ratio | 3.10 |
| Secondary Reactor Fresh Hydrogen Flow (sccm) | 2223 |
| Secondary Reactor Hydrogen Mole % | 0.234 |
| Fresh Comonomer injection location | Secondary Reactor |
| Ethylene Split (wt %) | 52.0 |

TABLE 1a

| 1. REACTOR FEED | Units | Inventive Example 1 Avg. |
|---|---|---|
| C2 feed split | % | 59.13 |
| Selected Octene Feed Point | # | Loop 1 |
| Selected Octene Flow | klbs/hr | 8.30 |

TABLE 1a-continued

| 1. REACTOR FEED | Units | Inventive Example 1 Avg. |
|---|---|---|
| Octene to Polymer Ratio | lb/lb | 15.6 |
| First Reactor Fresh Ethylene Flow | klbs/hr | 25.4 |
| First Reactor Solvent to Ethylene ratio | lb/lb | 6.00 |
| First Reactor Solvent Flow | klbs/hr | 158.4 |
| First Reactor Hydrogen Flow | lbs/hr | 6.4 |
| First Reactor Mole % Hydrogen | mol % | 0.35 |
| First Reactor Feed Temperature | ° C. | 12.3 |
| Second Reactor Fresh Ethylene Flow | klbs/hr | 18.1 |
| Second Reactor Solvent to Ethylene ratio | lb/lb | 2.70 |
| Second Reactor Solvent Flow | klbs/hr | 47.5 |
| Second Reactor Hydrogen Flow | lbs/hr | 1.18 |
| Second Reactor Mole % Hydrogen | mol % | 0.092 |
| Second Reactor Feed Temperature | ° C. | 12.0 |
| Recycle Solvent FTnIR [C2] | wt % | 0.75 |
| Recycle Solvent FTnIR [C8] | wt % | 6.68 |

TABLE 1b

| 2. REACTION | | Inventive Example 1 |
|---|---|---|
| First Reactor FTnIR [C2] | g/l | 17.88 |
| First Reactor Tempered Water Inlet temp. | ° C. | 131.6 |
| First Reactor Selected Temperature | ° C. | 140.1 |
| First Reactor Loop Differential Pressure | psid | 46.88 |
| First Reactor 10Log Viscosity | LogcP | 2.950 |
| First Reactor Solution Density | g/cm3 | 0.6098 |
| First Reactor Pump speed | rpm | 977 |
| First Reactor Residence time | Min | 10.15 |
| First Reactor Recycle ratio | — | 7.58 |
| First Reactor low pressure feed ratio | lb/lb | 0.50 |
| First Reactor Polymer concentration | wt % | 13.43 |
| First Reactor Ethylene conversion by FTnIR | — | 79.48 |
| Second Reactor FTnIR [C2] | g/l | 7.80 |
| Second Reactor Tempered Water Inlet temp. | ° C. | 176.8 |
| Second Reactor Selected Temperature | ° C. | 190.0 |
| Second Reactor Loop Differential Pressure | psid | 39.30 |
| Second Reactor 10Log Viscosity | LogcP | 2.840 |
| Second Reactor Solution Density | g/cm3 | 0.5988 |
| Second Reactor Pump speed | rpm | 1166 |
| Second Reactor Residence time | Min | 7.30 |
| Second Reactor Recycle ratio | — | 6.51 |
| Second Reactor low pressure feed ratio | lb/lb | 0.09 |
| Second Reactor Polymer concentration | wt % | 20.88 |
| Overall Ethylene conversion by FTnIR | % | 92.64 |
| Overall Ethylene conversion by vent | % | 92.63 |
| Ethylene vent mass flow | lbs/hr | 1441 |

TABLE 1c

| 3. CATALYST | | Inventive Example 1 |
|---|---|---|
| First Reactor DOC-6114 flow | lb/hr | 7.87 |
| First Reactor RIBS-2 flow | lb/hr | 6.37 |
| First Reactor MMAO-3A flow | lb/hr | 7.95 |
| Second Reactor DOC-6114 flow | lb/hr | 54.64 |
| Second Reactor RIBS-2 flow | lb/hr | 10.42 |
| Second Reactor MMAO-3A flow | lb/hr | 14.76 |
| First Reactor DOC-6114 concentration | wt % DOC-6114 | 0.25 |
| First Reactor RIBS-2 concentration | wt % RIBS-2 | 0.50 |
| First Reactor MMAO-3A (Al) concentration | wt % Al | 0.10 |
| Second Reactor DOC-6114 concentration | wt % DOC-6114 | 0.25 |
| Second Reactor RIBS-2 concentration | wt % RIBS-2 | 1.80 |
| Second Reactor MMAO-3A (Al) concentration | wt % Al | 0.10 |
| First Reactor RIBS-2 to Zr ratio | ratio | 1.42 |
| First Reactor Aluminum to Zr ratio | ratio | 16.17 |
| First Reactor Catalyst (Zr) efficiency | M lbs poly/lb Zr | 15.5; |
| First Reactor RIBS-2 efficiency | M lbs poly/lb RIBS-2 | 0.83 |
| Second Reactor RIBS-2 to Zr ratio | ratio | 1.20 |
| Second Reactor Aluminum to Zr ratio | ratio | 4.32 |
| Second Reactor Catalyst (Zr) efficiency | M lbs poly/lb Zr | 2.23 |
| Second Reactor RIBS-2 efficiency | M lbs poly/lb RIBS-2 | 0.14 |
| Overall Catalyst (Zr) efficiency | M lbs poly/lb Zr | 3.90 |
| Overall RIBS-2 efficiency | M lbs poly/lb RIBS-2 | 0.24 |

TABLE 1d

Catalysts and catalyst components detailed nomenclature.

| Description | CAS Name |
|---|---|
| CAT-A | Zirconium, [2,2'''-[1,3-propanediylbis(oxy-O)]bis[3'',5,5''-tris(1,1-dimethylethyl)-5'-methyl[1,1':3',1''-terphenyl]-2'-olato-O]]dimethyl-,(OC-6-33)- |
| CAT-B | [N-(1,1-dimethylethyl)-1,1-dimethyl-1-[(1,2,3,3a,8a-)-1,5,6,7-tetrahydro-2-methyl-s-indacen-1-yl]silanaminato(2-)-N][(1,2,3,4-)-1,3-pentadiene]- |
| RIBS-2 | Amines, bis(hydrogenated tallow alkyl)methyl, tetrakis(pentafluorophenyl)borate(1-) |
| MMAO-3A | Aluminoxanes, iso-Bu Me, branched, cyclic and linear; modified methyl aluminoxane |

TABLE 2

| Melt Index, $I_2$ (lab) | dg/min | 0.79 |
|---|---|---|
| $I_{10}/I_2$ (lab) | Ratio | 8.07 |
| Density (lab) | g/cm3 | 0.904 |
| Polymer split in reactor 1 | wt % | 50 |

TABLE 3

| | Polymer Split reactor 1(%) | Overall melt index (dg/min) | Oveall $I_{10}/I_2$ | Overall Density (kg/m³) |
|---|---|---|---|---|
| Resin A | 54 | 0.8 | 8.3 | 912 |

TABLE 4

| | Unsaturation Unit/1,000,000 C | | | | |
|---|---|---|---|---|---|
| | vinylene | trisubstituted | vinyl | vinylidene | Total |
| Inventive Example 1 | 16 | 7 | 55 | 12 | 90 |

TABLE 5

| | Comonomer distribution Index | Standard Deviation, ° C. | HalfWidth, ° C. | HalfWidth/Stdev | CDC (Comonomer Dist. Constant) |
|---|---|---|---|---|---|
| Inventive Example 1 | 89.10 | 9.48 | 6.61 | 0.70 | 127.9 |

TABLE 6

| DSC Sample | Cool Curve Data | | 2nd Heat Curve Data | | |
|---|---|---|---|---|---|
| | Crystallization temperature (° C.) | Total Heat of fusion-cooling (J/g) | Peak melting point (° C.) | Total Heat of fusion-heating (J/g) | Heat of fusion above 115° C. (J/g) |
| Inventive Example 1 | 83.7 | 104.9 | 99.5 | 105.5 | 0.027 |

TABLE 7

| | Conventional GPC $M_n$ (g/mole) | Conventional GPC $M_w$ (g/mole) | Conventional GPC $M_z$ (g/mole) | Conventional GPC $M_w/M_n$ |
|---|---|---|---|---|
| Inventive Example 1 | 34,880 | 101,200 | 201,500 | 2.90 |

TABLE 8

| Inventive Film 1 | Screw speed (RPM) | % of full load current | Melt temperature (° F.) | Melt pressure (psi) | Layer % | Output (lb/hr) |
|---|---|---|---|---|---|---|
| Extruder 1 | 49.3 | 59 | 467 | 6354 | 20 | 75 |
| Extruder 2 | 42.1 | 53.3 | 473 | 5403 | 12 | 45 |
| Extruder 3 | 42.4 | 53.9 | 473 | 5678 | 12 | 45 |
| Extruder 4 | 43.6 | 52.7 | 455 | 476 | 12 | 45 |
| Extruder 5 | 43.1 | 50 | 453 | 4257 | 12 | 45 |
| Extruder 6 | 42.4 | 54.1 | 475 | 5506 | 12 | 45 |
| Extruder 7 | 49 | 58.8 | 462 | 7328 | 20 | 75 |

All temperatures were measured at one point during the process, and maintained at approximately the measured value ±2° F.

TABLE 8a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 85.4 | 79.7 | 81.5 | 82.1 | 79.6 | 80.7 | 80 |
| Zone 2 | 300.6 | 305.5 | 302.4 | 304.5 | 304.5 | 312.5 | 308 |
| Zone 3 | 379.6 | 380 | 379.8 | 380 | 379.2 | 381.1 | 380.1 |
| Zone 4 | 379.8 | 379.9 | 380 | 381.8 | 379.9 | 382.2 | 379.9 |
| Zone 5 | 381.7 | 379.6 | 379.2 | 381 | 379.4 | 377.3 | 381.8 |
| Adapter 1 | 450 | 450.4 | 449.6 | 449.6 | 450 | 450.8 | 450.2 |
| Adapter 2 | 451 | 455.6 | 448.1 | 453.1 | 444.7 | 449.2 | 443.7 |
| Adapter 3 | 450.4 | 452.2 | 447.8 | 450.6 | 449.7 | 448.1 | 447.6 | wAll temperatures were measured at one point during the process, and maintained at approximately the measured value ±2° F.

TABLE 8b

| Die temperature 1 (° F.) | 452.6 | Blow up ratio | 2.56 | Die gap (mm) | 2 |
|---|---|---|---|---|---|
| Die temperature 2 (° F.) | 447.9 | Frost line height | 36 | Nip speed (ft/min) | 49.9 |
| Die temperature 3 (° F.) | 449.5 | Lay flat (inches) | 39.58 | Die diameter (mm) | 250 |
| Die temperature 4 (° F.) | 449.8 | left gusset (inches) | 7.5 | | |
| Die temperature 5 (° F.) | 450.2 | right gusset (inches) net layflat (inches) | 7.5 24.58 | | |

All temperatures were measured at one point during the process, and maintained at approximately the measured value ±2° F.

TABLE 9

| Inventive Film 2 | Screw speed (RPM) | % of full load current | Melt temperature (° F.) | Melt pressure (psi) | Layer % | Output (lb/hr) |
|---|---|---|---|---|---|---|
| Extruder 1 | 49.7 | 59 | 466.4 | 6310 | 20 | 75 |
| Extruder 2 | 42.3 | 53.9 | 468.8 | 5438 | 12 | 45 |
| Extruder 3 | 43.3 | 54.5 | 477.1 | 5752 | 12 | 45 |
| Extruder 4 | 43 | 54.3 | 457 | 4768 | 12 | 45 |
| Extruder 5 | 45.3 | 51.6 | 458.8 | 4332 | 12 | 45 |
| Extruder 6 | 42.2 | 54.7 | 477.8 | 5544 | 12 | 45 |
| Extruder 7 | 48.8 | 58.8 | 467.3 | 7182 | 20 | 75 |

All temperatures were measured at one point during the process, and maintained at approximately the measured value ±2° F.

TABLE 9a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 86.9 | 80.3 | 80.6 | 80.2 | 80.3 | 81 | 80.1 |
| Zone 2 | 302.9 | 305.2 | 301.7 | 302 | 304.7 | 312.5 | 307.8 |
| Zone 3 | 380.1 | 380.3 | 380.6 | 380 | 380.7 | 381 | 379.8 |
| Zone 4 | 380.4 | 379.7 | 379.5 | 377.9 | 378.7 | 381.9 | 379.8 |
| Zone 5 | 380.7 | 379.6 | 379.9 | 379.6 | 379.1 | 377.8 | 379.8 |
| Adapter 1 | 450.1 | 450.2 | 449.5 | 449 | 449.5 | 451 | 450 |
| Adapter 2 | 447.6 | 445.8 | 447.9 | 448.4 | 458.8 | 447.4 | 457.4 |
| Adapter 3 | 449 | 448.4 | 449.5 | 450 | 450.5 | 449.1 | 452.4 |

All temperatures were measured at one point during the process, and maintained at approximately the measured value ±2° F.

TABLE 9b

| Die temperature 1 (° F.) | 447 | Blow up ratio | 3.59 | Die gap (mm) | 2 |
|---|---|---|---|---|---|
| Die temperature 2 (° F.) | 449.1 | Frost line height | 37 | Nip speed (ft/min) | 35.6 |
| Die temperature 3 (° F.) | 449.2 | Lay flat (inches) | 55.67 | Die diameter (mm) | 250 |
| Die temperature 4 (° F.) | 449.4 | left gusset (inches) | 11.5 | | |
| Die temperature 5 (° F.) | 449.2 | right gusset (inches) | 11.5 | | |
| | | net layflat (inches) | 32.67 | | |

All temperatures were measured at one point during the process, and maintained at approximately the measured value ±2° F.

TABLE 10

| Comparative Film 1 | Screw speed (RPM) | % of full load current | Melt temperature (° F.) | Melt pressure (psi) | Layer % | Output (lb/hr) |
|---|---|---|---|---|---|---|
| Extruder 1 | 45 | 63.3 | 473.4 | 7677 | 20 | 75 |
| Extruder 2 | 30.9 | 48.9 | 455.9 | 4587 | 12 | 45 |
| Extruder 3 | 26.9 | 47.9 | 462.5 | 4647 | 12 | 45 |
| Extruder 4 | 31.5 | 48.1 | 445.3 | 3911 | 12 | 45 |
| Extruder 5 | 32.6 | 48.2 | 436.6 | 3583 | 12 | 45 |
| Extruder 6 | 31.1 | 48.7 | 461.8 | 4513 | 12 | 45 |
| Extruder 7 | 46.4 | 65.6 | 472.7 | 8658 | 20 | 75 |

All temperatures were measured at one point during the process, and maintained at approximately the measured value ±2° F.

TABLE 10a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 85.6 | 81.7 | 80.3 | 82.6 | 80.5 | 82.5 | 80.3 |
| Zone 2 | 380.6 | 380.4 | 379.5 | 380.2 | 380.1 | 380 | 380.3 |
| Zone 3 | 381.4 | 379.8 | 379.8 | 380.1 | 380 | 379.8 | 380.2 |
| Zone 4 | 380.8 | 379.6 | 379.8 | 379.9 | 379.9 | 379.5 | 379.7 |
| Zone 5 | 380.7 | 380.1 | 379.8 | 380 | 380.1 | 380 | 379.3 |
| Adapter 1 | 451 | 450.1 | 449.6 | 450.1 | 449.8 | 450 | 449.8 |
| Adapter 2 | 452.4 | 450.7 | 441.7 | 461.4 | 442.1 | 443.1 | 445.6 |
| Adapter 3 | 450.6 | 450.2 | 446.6 | 449.9 | 450.1 | 447.2 | 448.1 |

TABLE 10b

| Die temperature 1 (° F.) | 449.4 | Blow up ratio | 2.56 | Die gap (mm) | 2 |
|---|---|---|---|---|---|
| Die temperature 2 (° F.) | 449.4 | Frost line height (inches) | 35 | Nip speed (ft/min) | 49.2 |
| Die temperature 3 (° F.) | 448.7 | Lay flat (inches) | 39.58 | Die diameter (mm) | 250 |
| Die temperature 4 (° F.) | 449.6 | left gusset (inches) | 7.5 | | |
| Die temperature 5 (° F.) | 449.4 | right gusset (inches) | 7.5 | | |
| | | net layflat (inches) | 24.58 | | |

All temperatures were measured at one point during the process, and maintained at approximately the measured value ±2° F.

TABLE 11

| Comparative Film 2 | Screw speed (RPM) | % of full load current | Melt temperature (° F.) | Melt pressure (psi) | Layer % | Output (lb/hr) |
|---|---|---|---|---|---|---|
| Extruder 1 | 45 | 64.5 | 476.2 | 7649 | 20 | 74.7 |
| Extruder 2 | 31.1 | 48.9 | 455.4 | 4656 | 12 | 45 |
| Extruder 3 | 32.9 | 48.4 | 460.4 | 4853 | 12 | 45 |
| Extruder 4 | 32 | 48.2 | 443.4 | 3996 | 12 | 45 |
| Extruder 5 | 33.1 | 48.4 | 438.7 | 3616 | 12 | 45 |
| Extruder 6 | 30.9 | 48.8 | 459.8 | 4556 | 12 | 45 |
| Extruder 7 | 46.3 | 65.6 | 475.1 | 8667 | 20 | 75.3 |

All temperatures were measured at one point during the process, and maintained at approximately the measured value ±2° F.

TABLE 11a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 86.1 | 80.4 | 81.7 | 82.8 | 80 | 82.6 | 80.1 |
| Zone 2 | 380.4 | 380.2 | 379.9 | 380.4 | 380.2 | 380.5 | 380.2 |
| Zone 3 | 380 | 379.9 | 380 | 380 | 380 | 380.3 | 380.2 |
| Zone 4 | 380.1 | 380 | 379.9 | 380.1 | 380.1 | 379.7 | 379.7 |
| Zone 5 | 378.9 | 380.2 | 380.1 | 380.3 | 380 | 380.1 | 380.1 |
| Adapter 1 | 449.9 | 450 | 450 | 450 | 449.9 | 450 | 449.8 |
| Adapter 2 | 456 | 448.8 | 444.6 | 456.2 | 449.9 | 444.4 | 450.6 |
| Adapter 3 | 451.8 | 449.4 | 446.4 | 449.9 | 450.4 | 446.5 | 449.6 |

All temperatures were measured at one point during the process, and maintained at approximately the measured value ±2° F.

TABLE 11b

| Die temperature 1 (° F.) | 450.6 | Blow up ratio | 3.59 | Die gap (mm) | 2 |
|---|---|---|---|---|---|
| Die temperature 2 (° F.) | 450.7 | Frost line height (inches) | 35 | Nip speed (ft/min) | 34.7 |
| Die temperature 3 (° F.) | 450.5 | Lay flat (inches) | 55.53 | Die diameter (mm) | 250 |
| Die temperature 4 (° F.) | 450.2 | left gusset (inches) | 11.5 | | |
| Die temperature 5 (° F.) | 450.3 | right gusset (inches) net layflat (inches) | 11.5 32.53 | | |

All temperatures were measured at one point during the process, and maintained at approximately the measured value ±2° F.

TABLE 12

Film physical property data

| Test/Sample | Comparative 1 | Comparative 2 | Example 1 | Example 2 |
|---|---|---|---|---|
| Stretch hooder-100/75 test | | | | |
| Average Elastic Recovery (%) | 41.8 | 42.4 | 46.4 | 47.0 |
| Average Permanent Deformation (%) | 58.2 | 57.6 | 53.6 | 53.0 |
| Stretch hooder-60/40 test | | | | |
| Average Elastic Recovery (%) | 47.7 | 48.6 | 52.9 | 53.0 |
| Average Permanent Deformation (%) | 52.3 | 51.4 | 47.1 | 47.0 |
| Average MD tear (g) | 917 | 1143 | 1276 | 1403 |
| Average Normalized MD tear (g/mil) | 229 | 286 | 319 | 351 |
| Dart B (g) | 1180 | 1410 | >1500* | >1500* |
| Dart B (g/mil) | 295 | 352.5 | >350 | >350 |
| Average-MD Break Stress (psi) | 4491 | 4698 | 6243 | 6384 |
| Average-CD Break Stress (psi) | 4347 | 4440 | 6124 | 6172 |

*Maximum value that can be tested in dart B test is 1500 g

We claim:

1. A monolayer film comprising at least 50 weight percent polyethylene copolymer having a melt index less than 2 grams/10 minutes, a density less than or equal to 0.910 g/cm3, an total heat of fusion less than 120 joules/gram and a heat of fusion above 115° C. of less than 5 Joules/gram.

2. The monolayer film of claim 1 wherein the film is made using a blown film process.

3. The monolayer film of claim 1, wherein the monolayer film is a stretch hood film.

4. The monolayer film of claim 1 wherein the polyethylene copolymer has a $M_w/M_n$ of at least 2.5.

5. The monolayer film of claim 1 wherein the polyethylene copolymer is characterized by a Comonomer Distribution Constant greater than about 45 and as high as 400, and wherein the polyethylene copolymer has less than 120 total unsaturation unit/1,000,000 C.

6. The monolayer film of claim 1 wherein the polyethylene copolymer is characterized by up to about 3 long chain branches/1000 carbons.

7. The monolayer film of claim 1 wherein the polyethylene copolymer is further characterized as comprising less than 20 vinylidene unsaturation unit/1,000,000 C.

8. The monolayer film of claim 1 wherein the polyethylene copolymer comprises a single DSC melting peak.

9. A method of producing an ethylene-based polymer composition, the composition comprising at least 50 weight percent polyethylene copolymer having a melt index less than 2 grams/10 minutes, a density less than or equal to 0.910 g/cm3, a total heat of fusion less than 120 Joules/gram, and a heat of fusion above 115° C. of less than 5 Joules/gram, the method comprising:
   a) purifying ethylene and one or more comonomers and a comonomer solvent with one or more molecular sieves;
   b) pressurizing the purified ethylene via mechanical compressor to above reaction pressure at 750 psig and feeding a first ethylene portion to a first polymerization reactor and a second ethylene portion to a second polymerization reactor;
   c) pressurizing the solvent and comonomer via mechanical positive displacement pump to above reaction pressure at 750 psig and feeding a first solvent/comonomer portion to the first polymerization reactor and a second solvent/comonomer portion to the second polymerization reactor;
   d) feeding a high purity grade hydrogen pressurized to at least 750 psig to the first and second polymerization reactors;
   e) diluting individual catalyst components to specified component concentrations with purified solvent and pressurized to above reaction pressure at 750 psig and feeding the diluted, pressurized catalyst components to the first and second polymerization reactors;
   f) polymerizing the monomer and comonomer in the first and second polymerization reactors and producing a virgin product stream;

g) as the virgin product stream exits the second reactor, contacting it with a catalyst kill to stop the reaction, optionally combining the product stream with one or more additives, to form a product stream, and contacting the product stream with one or more static mixing elements to evenly disperse the catalyst kill and any optional additives, forming a well-mixed product stream;

h) separating and devolatilizing the well-mixed product stream by removing polymer from the solvent, unreacted hydrogen, and unreacted monomer and comonomer;

i) purifying at least some of the solvent, unreacted hydrogen, and unreacted comonomer;

k) recycling at least some of the solvent, unreacted hydrogen, and unreacted comonomer to one or more of the polymerization reactors;

wherein the first and second polymerization reactors are each continuous solution polymerization reactors consisting of two liquid full, non-adiabatic, isothermal, circulating, and independently controlled loops operating in a series configuration, each reactor having independent control of all solvent, monomer, comonomer, hydrogen, and catalyst component feeds, and, wherein the combined solvent, monomer, comonomer and hydrogen feed to each reactor is independently temperature controlled to between 5° C. to 50° C.

10. The method of claim 9 wherein all reaction feed flows are measured with mass flow meters and independently controlled with computer automated valve control systems.

11. The method of claim 9 wherein the comonomer feed to the polymerization reactors can be manually aligned to add comonomer to one of three choices: the first reactor, the second reactor, or the common solvent and then split between both reactors proportionate to the solvent feed split.

12. The method of claim 9 wherein non-polymer portions removed in the devolatilization step pass through various pieces of equipment which separate most of the ethylene which is removed from the system to a vent destruction unit.

13. The method of claim 9 comprising controlling the density of the ethylene-based polymer composition by fortifying the solvent with fresh comonomer prior to re-entry to one or more of the polymerization reactors.

14. The method of claim 13 comprising controlling the density of the ethylene-based polymer composition so that it has a $M_w/M_n$ of at least 2.5 by fortifying the solvent with fresh hydrogen to achieve the polymer molecular weight target prior to re-entry to one or more of the polymerization reactors.

15. The method of claim 9 wherein the catalyst components combine to form a post-metallocene catalyst.

16. The method of claim 9 wherein the total fresh feed to each polymerization reactor is injected using injectors into each reactor at two injection locations per reactor roughly with equal reactor volumes between each injection location.

17. The method of claim 16 wherein the fresh feed is controlled with each injector receiving half of the total fresh feed mass flow.

18. The method of claim 9 wherein the catalyst components are injected into the polymerization reactor through injection stingers and are each separately injected into the same relative location in the reactor with no contact time prior to the reactor, the primary catalyst component feed being computer controlled to maintain the reactor monomer concentration at a specified target, the two catalyst components being fed based on calculated specified molar ratios to the primary catalyst component.

19. The method of claim 18 wherein immediately following each fresh injection location (either feed or catalyst), the feed streams are mixed with the circulating polymerization reactor contents with static mixing elements, the contents of each reactor continuously circulated through heat exchangers responsible for removing much of the heat of reaction and with the temperature of the coolant side responsible for maintaining isothermal reaction environment at a specified temperature.

20. The method of claim 19 wherein circulation around each reactor loop is provided by a screw pump.

21. The method the claim 19 wherein the effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor.

* * * * *